Jan. 15, 1963

P. R. ADAMS ET AL 3,073,168

ACCELEROMETER

Filed Oct. 3, 1958

Inventors
PAUL R. ADAMS
RICHARD S. BOVITZ
GERALD B. SPEEN
FREEMAN F. HALL

By *Percy P. Lantz*
Attorney

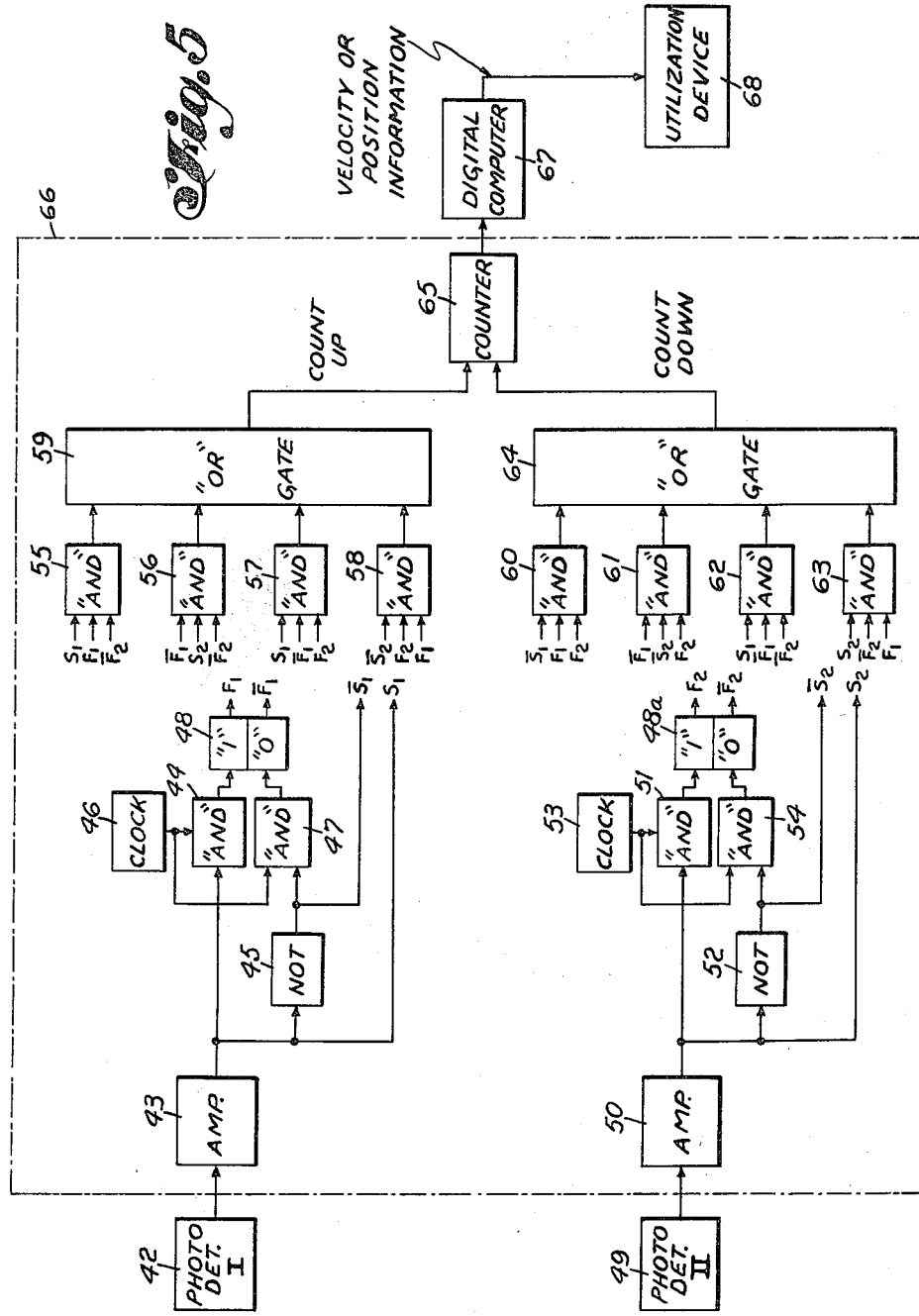

United States Patent Office 3,073,168
Patented Jan. 15, 1963

3,073,168
ACCELEROMETER
Paul R. Adams, Bethesda, Md., and Richard S. Bovitz, Pacoima, Gerald Bruce Speen, Sepulveda, and Freeman F. Hall, Granada Hills, Calif., assignors to International Telephone and Telegraph Corporation, Nutley, N.J., a corporation of Maryland
Filed Oct. 3, 1958, Ser. No. 765,093
10 Claims. (Cl. 73—517)

This invention refers to accelerometers, and more particularly to an accelerometer which with its associated circuitry provides output information in digital form.

Most accelerometers in use today are of an analog output type, or, where digital outputs are desired, of an analog-to-digital conversion type. Therefore these accelerometers are hampered in accuracy by the relatively low accuracy of transducers or circuit elements, which, in the present state of the art, have a maximum accuracy of approximately .01 percent. Since the advent of missile guidance and space travel, the necessity for highly accurate accelerometers has become more and more apparent. As the accuracy of various instruments was increased, more of the basic errors were discovered and new error sources became apparent. The usefulness of a digital output accelerometer became apparent with the realization of the limitations of the analog computer. Furthermore, most known apparatus in this field suffer from one or more of the following inadequacies: they often have comparatively low dynamic ranges in the order of 5000:1; have low resonant frequency, mostly less than 15 cycles per second; suffer from restoring force losses, including hysteresis effects; and exhibit non-linearity effects. They are also predominantly of the forcing type, i.e., they work at null position at all times, a condition which requires complicated servomechanism systems. It has generally been found that an accelerometer that exhibits outstanding qualities in some of these respects will have serious limitations in others.

One object of this invention is to provide a highly accurate, high dynamic range linear accelerometer which supplies its output information in digital form.

Another object is to provide an accelerometer characterized by a digital output, open loop operation (non-forcing), direct output (as opposed to servo output), high dynamic ranges (at least 10,000:1), high accuracy (better than 0.01% of full scale), and moderately high natural frequency of resonance (greater than 25 cycles per second, and preferably greater than 75 cycles per second).

Another object is the provision of optical apparatus whereby the principle of interferometry is used in the accelerometer to detect and present acceleration information in digital form.

Another object is to utilize multiple passes of the sensing light beam in the interferometer system between a fixed mirror and a moving mirror to amplify the shift of the sensing mass which carries the moving mirror.

Another object is to employ the principle of temperature stabilization by means of "change of state" ovens to diminish errors due to dimensional instability, temperature dependence of elastic moduli and variation of internal friction associated with the material from which the accelerometer members are constructed.

Another object is to utilize materials that are extremely stable, both physically and chemically, in the construction of the acceleration sensing elements of an accelerometer.

Another object is to avoid the use of hinges or other loss producing devices in the construction of the accelerometer.

Another object of this invention is to utilize extremely high "Q" materials, such as quartz, in the restoring spring system of an accelerometer.

An important feature of this invention is the structural arrangement of the accelerometer which comprises a housing and inertia member, means for resiliently supporting the inertia member to the housing, means associated with the inertia member for producing a moving radiation pattern in response to the relative movement of the inertia member when acted upon by an external acceleration and means for sensing the moving radiation pattern to produce a digital output indicative of the magnitude and direction of that movement.

A further feature is that the means for producing a moving radiation pattern in the accelerometer comprises a light source and interferometer means for producing an interference fringe pattern which moves when the inertia member is caused to move by action of the accelerating force. The means for sensing the movement of the interference fringe pattern includes a plurality of photo-detectors which provide a digital output indicative of the magnitude and direction of the relative movement of the inertia member.

Another feature is that the accelerometer housing comprises first and second chambers, a passage connecting the first and second chambers and means for maintaining the temperature of the second chamber constant. The light source is disposed within the first chamber which also includes optical means for collimating into a beam the output of the light source and a mirror disposed at an acute angle to the collimating means to reflect the light beam into the passage.

Another feature is that the plurality of photo-detectors are disposed within the second chamber with the axis of each of said photo-detectors in parallel relationship with the longitudinal axis of the second chamber and a telescope is disposed perpendicular to the longitudinal axis for collimating the reflected light beam from the second mirror and the reflected light beam from the fourth mirror along a path parallel to the longitudinal axis. A screen having a plurality of slits therethrough is disposed intermediate the second collimator and the photo-detectors for displaying an interferometer fringe pattern, the movement of which is sensed by the photo-detectors.

A further feature is that each slit is spaced apart from an adjacent slit by a length determined by the number of sensing devices used, the number of intensity levels sensed, and the spacial distribution of the fringe pattern.

Still another feature is that the means for maintaining the temperature of the second chamber constant comprises a layer of heat insulating material surrounding the second chamber, a transparent member disposed in the passage to prevent heat transfer through the passage between the first and second chambers, means for minimizing temperature gradients disposed intermediate the second chamber and the insulating material, and members spacing apart the second chamber from the layer of insulating material. A control material having thermal ballasting properties is disposed within the spacing together with a resistance winding for heating the control material upon the application of an electric current to the winding, and control means are provided for sensing the changes in the volume of the control material proportional to the heat content of the control material, the control means having an output signal for controlling the application of the electric current to the resistance winding.

Another feature of this invention is a system for determining acceleration comprising an accelerometer having a digital output indicative of the magnitude and direction of movement of an inertia member within the accelerometer caused by an external acceleration, a first digital computer for computing from the acceleration output the magnitude and direction of the movement which is mathematically related to acceleration and a second digital computer for computing from the output of the first digital computer such information as velocity and position for use in a utilization device.

Still another feature is a system for determining acceleration where the accelerometer has an optical system producing an interferometer fringe pattern, photo-detectors for sensing the movement of the fringe pattern produced by the movement of the accelerometer's inertia member in response to the acceleration and a digital output which is indicative of the magnitude and direction of the movement of the fringe pattern. A first digital computer to which the acceleration output is coupled has means for establishing first and second sequences of movement of the fringe pattern for each of the photo-detectors used in the accelerometer; the first sequence corresponding to an increment of acceleration in a first direction and the second sequence corresponding to an increment of acceleration in the direction opposite the first direction. Means are provided to produce an output of the first digital computer which is indicative of the magnitude and direction of the movement of the fringe pattern that is proportional to the magnitude and direction of the acceleration, and this output is fed into a second digital computer which derives from this acceleration information secondary information such as velocity or position for use as may be required.

The above-mentioned and other features and objects of this invention will become more apparent by reference to the following description taken in conjunction with the accompanying drawings, in which:

FIG. 5 is a block diagram of the computer section of the accelerometer system.

Figure 1:
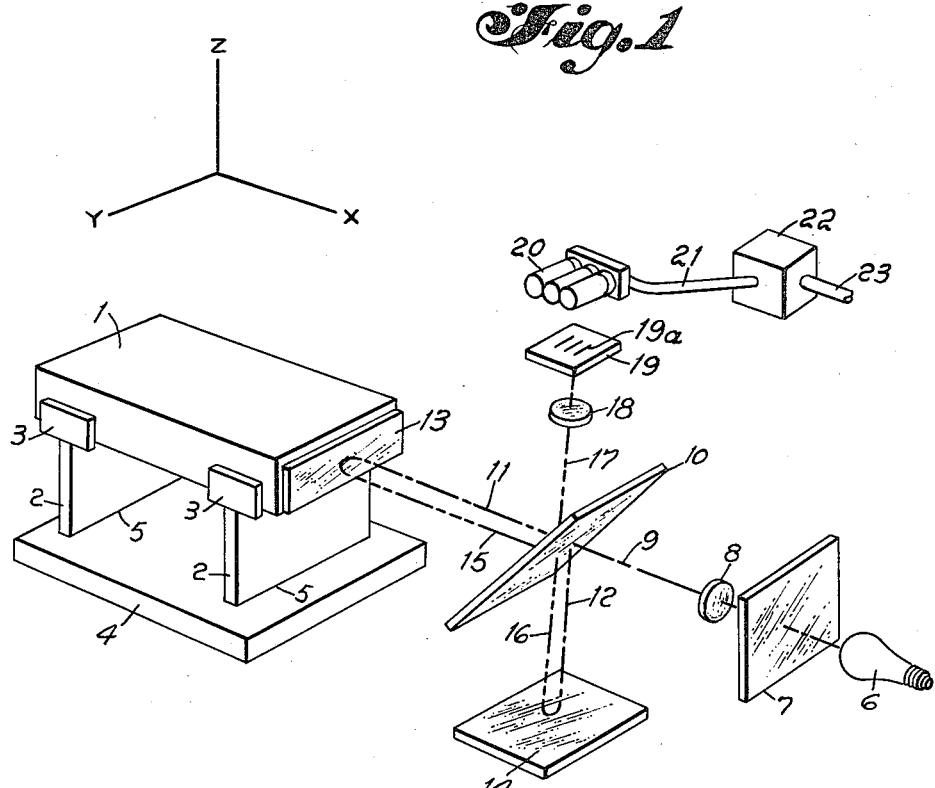
FIG. 1 is an isometric diagram illustrating the basic principles of this invention.

Referring to FIG. 1 of the drawings, the mass 1, which may be any of a variety of shapes or configurations, is conveniently made in the shape of a rectangular parallelepiped and is preferably constructed of any convenient stable material, such as fused silica. The mass 1 is supported near its ends by two springs 2 which are fabricated from a stable, high "Q" material, such as quartz and may be made in any desired shape having negligible sideways flexibility. The flat rectangular configuration is only one possible shape and is shown here by way of example only. It is obvious that the springs 2 have a much lower spring constant in one direction (along the X-axis) than in the direction of either of the two mutually perpendicular axes (Y-axis and Z-axis) by a considerable magnitude. Even this flexibility is comparatively small, however, since the springs 2 are most advantageously made somewhat thick in order to obtain from such a stiff spring small deflections and to obtain a natural resonant frequency above 15 cycles per second and preferably above 75 cycles per second. Quartz material is preferred for the springs because of its high stability and its low temperature coefficient of elasticity.

The springs 2 may be connected to the mass 1 in many various ways. Techniques such as cementing, soldering or clamping may be used and the obvious extension to one piece construction may also be utilized. It is important to realize that, regardless of the method of attachment used, the attachment points must be as far as possible from the bending points to avoid large bending moments. The effect of such construction avoids any losses due to hinge effects or joint hysteresis which might be apparent if such precautions are not taken. The springs 2 are terminated in and preferably integral with holding fixtures 3 which may be in the form of channels and which have sufficient area so that the bending moment at the top of the springs 2 is distributed over a large region. It should be noted that the holding fixtures can be eliminated if proper direct attachment of the springs 2 to the mass 1 can be accomplished. It should be obvious that one of the most efficient ways of avoiding the losses above would be to make the springs 2 and mass 1 as one unit and avoid any connections, joints, or holding fixtures altogether. In actual construction practice this may not be completely practical and one of the other suggested methods may have to be used. The springs 2 are integrally secured to base 4 at the attachment points 5, or might also use holding or attachment fixtures. The base 4 is most advantageously constructed of the same stable material as the springs 2 and the mass 1, though other materials are quite suitable.

The optical pickoff system schematically illustrated in FIG. 1 operates according to the basic principles of the conventional Michelson interferometer, though in practice, almost any convenient interference technique can be utilized. The lamp 6, is of a type that will produce a radiation containing the desired frequency and intensity for proper operation of the optical pickoff system, and is not limited to visible light. This radiation is filtered by the filter 7 and collimated by the lens system 8 to produce a beam of nearly monochromatic radiation 9, which is composed of essentially parallel rays and is of a sufficient intensity to operate the interferometer pickoff system. This beam of light 9 is partially reflected and partially transmitted by the partially silvered mirror 10 inclined at 45 degrees to beam 9 so as to form beams 11 and 12, respectively. Beams 11 and 12 are reflected by mirrors 13 and 14, respectively, and returned to mirror 10 as reflected beams 15 and 16 shown offset from the true reflected path to better illustrate the principle herein. At mirror 10 reflected beams 15 and 16 are combined so that they may interfere in beam 17 which is then directed by lens system 18 onto the display screen 19 having slits 19a cut therein where the interference pattern is detected by the proper arrangement of the photosensing detector devices 20, located immediately behind the display screen 19. The display screen 19 is advantageously made a part of the photosensing assembly.

In the operation of the apparatus as described, it can be seen that if there is any acceleration parallel to the input axis (X-axis), a force due to the mass 1 will act on the springs 2 with an effect proportional to the product of the applied acceleration and the mass 1. This force will produce a displacement of the mass 1 and the upper portion of the springs 2 until a restoring force due to the bending of the springs 2 becomes equal and opposite to the acceleration force. Since the deflection of the mass 1 and springs 2 causes a change in path length of beams 11 and 15, the interference or fringe pattern undergoes a displacement and this movement is detected by the photosensitive detectors 20. Since the number of fringes that pass a point on the screen 19 is proportional to the movement of mass 1, the acceleration at any moment may be determined by keeping a continual algebraic count of the fringe movement. It will be shown in detail below that it is possible to discriminate between the two directions of possible acceleration along the X axis by the use of two or more properly placed photosensing detectors 20. The output 21 of the photosensing detectors 20 is directed to the associated electronic equipment 22 from which the acceleration information is obtained in a convenient form at the output 23.

Figure 2:
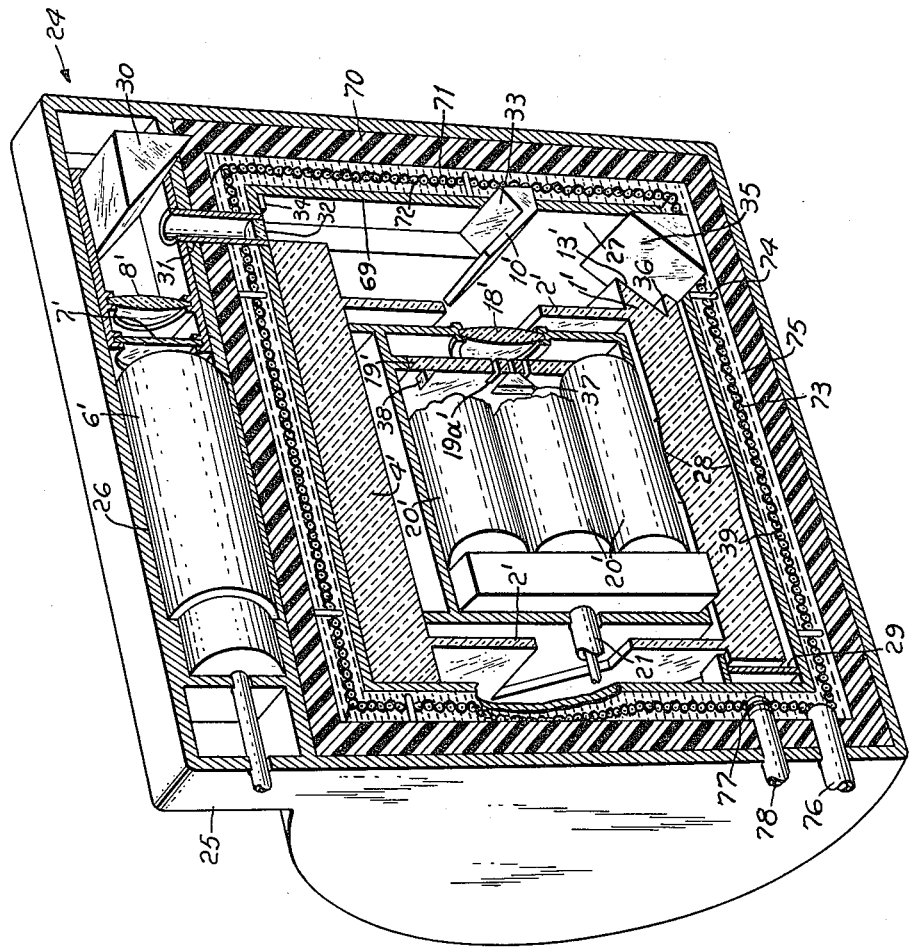
FIG. 2 is a sectional view with parts broken away of an embodiment of this invention.

FIG. 2 illustrates how the principles of this invention are utilized in a practical embodiment. An accelerometer 24 comprises a housing 25 having a first chamber 26 and a second chamber 27. In this case, the mass 1' is suspended from the springs 2' to achieve better stability than would result from a simply supported system such as that depicted in FIG. 1, though either method is practical. The mass 1', the springs 2', and the base 4', are shown constructed as an integral unit to eliminate losses due to hinge and hysteresis effects. This assembly is most advantageously made of an extremely stable material such as quartz, fused silicon dioxide ($SiO_2$), or boric oxide ($B_2O_3$), though many other materials can be used, and even combinations of materials may, in some cases, be found useful for the parts. The springs 2' are shown trapezoidal in shape to minimize possible deflections of the mass 1' in any direction perpendicular to the input axis.

Because of manufacturing tolerances, it is almost impossible to make the two springs 2' exactly identical; therefore, during the operation of the accelerometer it is very likely that because the two springs are not exactly identical the mass 1' may have a tendency to either tip upward or downward depending on the properties of the springs. This results in a non-parallel orientation for the mass 1' during operation and such an occurrence could cause errors. To compensate for this effect, the raised portions 28 on mass 1' are provided as a fine adjustment from which mass may be removed in order to shift the location of the center of gravity as needed. A tendency to pitch up is compensated for by raising the center of gravity of the mass 1' and, therefore, mass in this case would be removed from the lower raised portion 28. In the case where the mass dips, the opposite type of adjustment is performed. Raised portions 28 are also provided on either side of the mass 1' to compensate for any tendency to move sideways. The raised portions 28 are located on the mass 1' at approximately above, below, and either side of the center of gravity of mass 1'. It will be noted that a shifting of the center of gravity of mass 1' to compensate for the fact that the two springs are not identical can be accomplished quite accurately since the removal of a small amount of mass from the raised portions does not change the location of the center of gravity of mass 1' by a large amount at any one time, and, therefore, the center of gravity can be shifted by very small amounts and very accurately. Therefore, compensation and error correction can be made to an extremely good degree of accuracy.

An air damping mechanism 29 is shown at one end of the mass 1', but any convenient purely viscous damping system may be used at any of a variety of locations in the system.

The pickoff mechanism employed in this accelerometer uses an interferometer system such as the modified Michelson-type shown in FIGURE 1. Radiation from lamp 6' is transmitted through the filter 7' where it is rendered essentially monochromatic and is made parallel by the collimator assembly 8'. This monochromatic, collimated radiation reflects from the 45 degree inclined mirror 30 and travels through the insulating tube 31 and window 32 into the interior of the second chamber 27. The tube 31 and window 32 assembly is provided for the purpose of helping to prevent heat from being transferred between the interior of the accelerometer assembly and the exterior area where such items as the radiation source 6' are located. Upon entrance of the radiation into the second chamber 27, it is divided into two portions at the partially silvered 45 degree inclined surface 10'. The portion reflected from the surface 10' strikes the totally silvered surface 33 and is reflected upward toward the mirror 34, from which it is reflected so that the radiation retraces its path back to the partially reflecting surface 10' thereby, establishing the standard path length for the interferometer.

Figure 3:
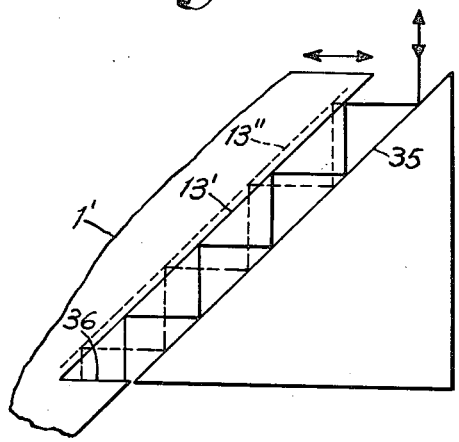
FIG. 3 is an enlarged side elevation view of the parallel mirrors used in one portion of the embodiment.

The radiation transmitted through the partially reflecting surface 10' continues until it strikes the inclined totally reflecting surface 35 from which it reflects to the essentially parallel inclined mirrored surface 13' of the mass 1'. The tremendous sensitivity of this instrument is, to a great extent, obtained by causing the beam to make several transits in the small space between the mirrored surfaces 13' and 35, as shown in FIG. 3. The broken line indications 13'' represent a longer path taken by the light beam due to a changed position of the mass 1'. After several traversals, the beam strikes the reversing mirror 36 and then returns to the partially reflecting surface 10' by essentially the same path that it travelled as it entered the space between the parallel surfaces. For the magnitude of accuracy and sensitivity associated with an instrument of this type, a minimum of six and preferably more than 12 transits between the mirrored surfaces 13' and 35 is desirable. However, it should be noted that the number of traversals between the two mirrors 13' and 35 does not change with the motion of the mass 1'. The smallest possible motion of the mass 1' is desirable and therefore the multiple reflection technique is used. An extremely small movement of the mass 1' produces a large change in path length, thus resulting in high sensitivity with only a small motion. This beam and the standard beam are adjusted in path length so that preferably they are about equal in length and first order interference is obtained, though other orders, are quite applicable. At the partially reflecting surface 10' the reflected beams are combined and transmitted through an appropriate lens system 18' to the display screen 19', which contains slits 19a' of the desired number. In the case illustrated, the optical unit 37 provides for the radiation that is incident on the center slit to be carried directly through to the center photosensing detector 20'. The two additional slits allow the radiation to reach the 45 degree inclined totally reflecting surfaces on the optical unit 37 from which the radiation travels to two additional totally reflecting surfaces 38 (lower one not shown) so that the radiation entering the extreme slits 19a' can strike the outer photosensing detectors 20'. The purpose of this system is to allow the sensing of the closest fringes possible, thus providing for the widest operational range with respect to the associated changes in fringe spacing and certain optical limitations. The photosensing detectors 20' detect a movement of the fringe pattern which is greatly amplified by the multiple traversals of the beam between the fixed mirror 35 and the mirror 13' attached to the sensitive moving mass 1', and produce an output that is proportional to the movement of the mass 1' and hence to input acceleration. This output is directed to an electronic data reduction system 22 through the connector and lead-in assembly 21.

Several methods of obtaining a useful output from the photosensing detectors 20' are possible. These methods vary according to the number of detectors used, type of interference pattern obtained, the number of intensity levels that can be discretely sensed, and other factors.

One practical method requires the observation of the interference pattern in two intensity levels only—dark and light where each of these levels represents equal displacements of the fringe pattern. With the photosensitive detectors spaced correctly, a fringe movement of $$\frac{\lambda'}{2p}$$

can be detected, where $\lambda'$ is the distance between adjacent centers of the fringes at the masked screen 19 and $p$ is the number of photosensing devices 20 used. Therefore, in the system illustrated, the use of three photosensing devices 20' allows a measurement of one-sixth λ'. The output from such a system is in binary digital form with the output from any one photosensitive device being "on" or "1" when the intensity received is greater than a certain predetermined value and "off" or "zero" when the intensity received is less than this predetermined value with allowances made for uncertainties in the biasing and sensing levels. However, it is not sufficient to know only the intensity of the portion of the fringes seen by the photo-detectors, but the direction of motion of the fringe pattern must also be determined. This is because the direction of movement of the fringe pattern corresponds to the direction of the movement of the mass 1 and this property discriminates then between positive and negative accelerations.

Figure 4:
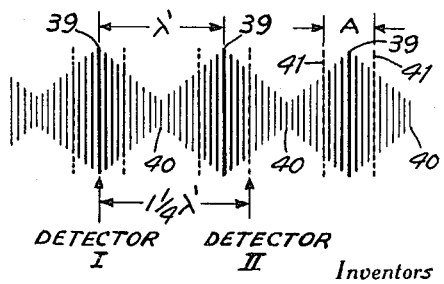
FIG. 4 is a portion of a typical interferometer fringe pattern.

It is possible to determine the direction of the input acceleration (referred to any existing level of acceleration) with two or more photosensing detectors by the process of considering the sequence of output information from such detectors. As an example, assume that two photosensing detectors are so placed that they are $(n+\frac{1}{4})\lambda'$ apart, where $n$ is an integer or zero, preferably chosen as small as possible to minimize the effects of changing fringe spacing, and λ' is the distance between adjacent maxima in the sensed fringe pattern. In FIG. 4 there is illustrated a portion of the interferometer fringe pattern showing three bright fringes 39 and the gradual decay of the light intensity to the dark parts 40 between the bright fringes. The portion "A" included between the dotted lines 41 is the required light intensity for causing the photo-detectors 20 to conduct. The sequence of output information might be in the following form if it is assumed that one direction of motion is encountered and if a starting position of dark-dark (corresponding to a position where both photosensing devices are sensing portions of the fringe pattern where the intensity is below that value causing conduction, though neither is exactly at a minima) is used; dark-dark; dark-light; light-light; light-dark; dark-dark; etc. It may be seen that the sequence of output information is different when the motion is reversed. In order to absolutely ascertain the direction of the input acceleration only a single pulse change is required and the direction of the change becomes absolutely known. If greater resolution is desired, it can be easily shown that three, or even more, photosensing detectors can be employed in a similar manner to obtain nonambiguous sequences of information.

Greater resolution can also be obtained by employing a method of detection that provides for the sensing of more than two intensity levels in the fringe pattern. By the addition of a single intensity level—dim—it is possible to double the resolution of the system with the same number of photosensing devices. In this case, where three intensity levels each representing equal increments of fringe displacement are sensed, the minimum detectable fringe movement may be given by the expression $$\frac{\lambda'}{4p}$$

where $p$ is the number of photosensing detectors and λ' is the distance between adjacent maxima in the sensed fringe pattern. The outputs of a photosensing device would then be "dark" or "zero" corresponding to a condition where the intensity does not exceed a certain first predetermined value, "dim" or "1" corresponding to a condition where the intensity exceeds this first predetermine value, but does not exceed a second predetermined value, and, finally "light" or "2" corresponding to a condition where the intensity exceeds the second predetermined value, with uncertainties taken into account.

As stated before, any convenient number of photosensing devices may be used, depending on the resolution required for the application. The output from such a system is in a form which can easily be converted, with conventional electronic computer techniques, to acceleration information in a form useful for most applications. The direction of the acceleration can be determined by observation of the sequence of output information and can easily be made to give a different series of data for both directions of movement.

The operation of the first digital computer may be better understood with reference to FIG. 5. For simplicity only two photo-detectors are utilized in this block diagram in accordance with the screen arrangement of FIG. 4, although, it is to be understood that more than two photo-detectors may be used when greater accuracy is desired. The output of the first photo-detector 42 is coupled to an amplifier 43 the output of which is fed into an "AND" gate 44 and an inverter circuit 45. A clock 46 generates timing pulses which are fed to the "AND" gate 44 and an "AND" gate 47 to which is also coupled the output of the inverter 45. The outputs of the "AND" gates 44 and 47 are fed into a bistable multivibrator 48 which has two outputs, $F_1$ and $\overline{F}_1$ which will be described later on. Similarly, the output of a second photo-detector 49 is fed into an amplifier 50 and the amplifier 50 ouput is coupled to an "AND" gate 51 and an inverter circuit 52. A clock 53 delivers timing pulses to the "AND" gate 51 and an "AND" gate 54 to which is also coupled the output of the inverter circuit 52. The outputs of the "AND" gates 51 and 54 are fed into a bistable multivibrator 48a which has two outputs $F_2$ and $\overline{F}_2$. The outputs of the multivibrators 48 and 49a and the outputs of the amplifiers 43 and 50, $S_1$ and $S_2$, and the output of the inverter circuits 45 and 52, $\overline{S}_1$ and $\overline{S}_2$ are fed into four "AND" gates 55, 56, 57 and 58. An output of "AND" gate 55 will occur when pulse inputs $\overline{S}_1$, $F_1$ and $F_2$ coincide; similarly "AND" gate 56 will have an output upon the coincidence at its input of the pulse $\overline{F}_1$, $S_2$ and $F_2$; "AND" gate 57 will have an output upon the coincidence of pulses $S_1$, $\overline{F}_1$ and $F_2$; and "AND" gate 58 will have an output if the pulses $\overline{S}_2$, $F_2$ and $F_1$ are coincident. The outputs of these four "AND" gates are fed into an "OR" gate 59 which will have a pulse output indicative of a "count up" or increase in acceleration.

Similarly, these outputs are fed into "AND" gates 60, 61, 62 and 63. The coincident input into "AND" gate 60 of pulses $\overline{S}_1$, $F_1$ and $F_2$ will produce an output of "AND" gate 60. The coincident pulse inputs $\overline{F}_1$, $\overline{S}_2$ and $F_2$ into "AND" gate 61 will produce an output thereof; similarly with "AND" gate 62 when pulse $S_1$, $\overline{F}_1$ and $\overline{F}_2$ coincide and "AND" gate 63 when input pulses $S_2$, $\overline{F}_2$ and $F_1$ are coincident. The output of "AND" gates 60, 61, 62 and 63 are fed into a second "OR" gate 64 which has a "count down" output or decrease in acceleration. The outputs of "OR" gates 59 and 64 are fed into a counter 65 which has either a positive and negative output depending on whether it is an increase or decrease in acceleration. The circuitry described up to this point and enclosed in the broken line 66 may be considered as constituting the first digital computer of this system. The output of the counter 65 is coupled to a digital computer 67 the output of which is the acceleration information that is desired. This acceleration information is fed into a utilization device 68 which may be either indicating devices or visual display of the acceleration or circuits for converting the digital information of the acceleration into control voltages.

Assume an increase in acceleration if the fringe pattern illustrated in FIG. 4 moves to the left and a decrease in acceleration if the pattern moves towards the right. Consider the photocells I and II "on" when receiving over a given intensity of light with the limits "A" and "off" when the light intensity falls below that value. Let "1" represent "on" and "0" represent "off."

| For Count Up (Increase acceleration) ||
|---|---|
| Detector I = $S_1$ | Detector II = $S_2$ |
| $x \to \begin{cases} 1 \\ 0 \end{cases}$ | 0 |
| $y \to \begin{cases} 0 \\ 1 \end{cases}$ | 0 |
|  | 1 |
|  | 1 |
| — | — |
| 1 | 0 |
| etc. | etc. |

| For Count Down (Decrease acceleration) ||
|---|---|
| Detector I = $S_1$ | Detector II = $S_2$ |
| $Z \begin{cases} 1 \\ 0 \end{cases}$ | 1 |
|  | 1 |
| 0 | 0 |
| 1 | 0 |
| — | — |
| 1 | 1 |
| etc. | etc. |

Let $S_1$ be an "on" or "1" condition
$\overline{S}_1$ be an "off" or "0" condition
$S_2$ be an "on" or "1" condition
$\overline{S}_2$ be an "off" or "0" condition Multivibrators 48 and 48a are designed so that they continually duplicate the condition of their corresponding detectors. Therefore:

$$F_1(\text{is "1"}) = CS_1$$
$$\overline{F}_1(\text{is "0"}) = C\overline{S}_1$$
$$F_2(\text{is "1"}) = CS_2$$
$$\overline{F}_2(\text{is "0"}) = C\overline{S}_2$$

Therefore, all the conditions for "count up" or "count down" can be written by the equations:

Count up $= [\overline{S}_1 F_1 \overline{F}_2 + \overline{F}_1 S_2 \overline{F}_2 + S_1 \overline{F}_1 F_2 + \overline{S}_2 F_2 F_1]$
Count down $= [\overline{S}_1 F_1 F_2 + \overline{F}_1 \overline{S}_2 F_2 + S_1 \overline{F}_1 \overline{F}_2 + S_2 \overline{F}_2 F_1]$ The first term of the first equation states that the photocell I is "0" ($\overline{S}_1$), it was "1" ($F_1$) and during this change detector II was "0" ($\overline{F}_2$). This corresponds to change $x$. The second term says the detector II is "1" ($S_2$), it was "0" ($\overline{F}_2$) and during the change, detector I was "0" ($\overline{F}_1$). This corresponds to the change $y$. These are two of the four count up conditions. The first term of the second equation says the detector I is in the "0" condition ($\overline{S}_1$), it was "1" ($F_1$) and during the change the detector II was "1" ($F_2$). This is the change Z. This is one of the four count down conditions. Thus, all of the count up and count down conditions are defined and none are duplicated, making each of the eight conditions unique.

It must be emphasized that the two examples given above are for illustrative purposes only so that the principles of detection may be understood. In actual practice the choice of the number and placement of the photo-sensing detectors and the number of intensity levels detected are chosen as the application dictates and a very great variety of practical combinations are possible.

Certain problems arise in a system such as this which are unique, but fortunately it is possible to overcome them by a single addition to the apparatus. It can be shown, for example, that the critical parts of the accelerometer such as the mass 1, springs 2, and base 4, should be kept dimensionally stable (in the order of $\pm 0.1 \times 10^{-6}$ inches). It becomes immediately apparent that the only way to accomplish such stability is through the use of extremely good temperature control so that dimensional variations can be kept to an absolute minimum. A less obvious source of possible error arises from the qualities and physical characteristics of quartz and certain other materials (in those designs wherein such materials are utilized). This involves the temperature dependence of the elastic moduli (e.g. dynamic Young's modulus) and the variations of the internal friction of these materials with temperature. In the design of an instrument as accurate as the accelerometer hereindisclosed, such characteristics acting on the quartz spring 2 can produce significant effects. According to Marx and Sivertsen (Journal of Applied Physics volume 24, No. 1, page 81) the elastic moduli of quartz vary with temperature in an essentially linear manner to such an extent that errors due to a variation in the elastic characteristics of the spring 2 might be apparent in the present system if temperature stabilization is not provided. The effect of variation in internal friction with temperature in quartz remains somewhat questionable at this time. However, it is known that through the use of efficient temperature stabilization, all of these effects can be brought to a level small enough to render them ineffective even with respect to the high accuracy of the unit. In the accelerometer shown in FIGURE 2, efficient temperature stabilization is accomplished by a "change of state" oven used to enclose the inertia member and pick-off assembly. In actual practice more than one of these ovens might well be used within one another in order to achieve extremely critical temperature control if it is found necessary.

Various types of "change of state" ovens are known, but one practical type might be similar to that shown in FIG. 2. The second chamber 27 is enclosed within a container 69 which is constructed from a highly thermally conductive material such as copper. A layer of an insulating material 70 of sufficient thickness to minimize heat transfer between the interior of the second chamber and the surrounding atmosphere is provided directly within the housing 25. The insulating material 70 is coated with a highly thermally conductive coating 71, such as silver on copper, which serves to minimize the temperature gradients which might arise in the portions of the oven containing the control substance 75.

Located between the accelerometer container 69 and the conductive coating 71 are the windings 72 and 73 which when energized by an electric current provide a means for raising the temperature of the accelerometer from ambient to operating temperature quickly and for providing the control of the operational temperature. The standoffs 74 provide a means for rigidly positioning the container 69 from insulating material 70.

The satisfactory operation of the "change of state" oven depends on the use of a suitable control substance 75 and an adequate means of sensing the changes in the state of this material. One such control substance might be paradibromobenzene ($C_6H_4Br_2$) which, when properly monitored, will maintain the temperature of the accelerometer case 35 at 86.9° C. with a variation of not more than plus-or-minus 0.005° C. During operation of the oven, the control substance 75 is kept in a condition where it is partially liquid and partially solid to achieve a thermal ballasting action, since a substance in this state exhibits the property of absorbing or emitting heat without a change in temperature. The control substance 75 is brought to its operating temperature by supplying electrical energy through the connector and lead-in assembly 76 to the control windings 72 and 73. Once operational temperature is reached, it is found that changes in heat content produce proportional changes in the volume of the control substance 75 with no accompanying temperature change. The volume change, due to a change in heat content, is sensed by the volume transducer 77 which produces and sends electrical signals through the connector and lead-in assembly 78 to the heater control system (not shown) for the required operation of the heater coils 72 and 73 before cooling permits a change in temperature.

Other means may be used to control this thermal action. It is possible to monitor other parameters characteristic of the control substance which vary with the state of the material, such as thermal conductivity, electrical resistance, color, permeability, etc. The selection of the property for use as a control indicator must depend on the most desirable method of control, the substance used, and the allowable degree of temperature variation. Maintaining such a high degree of temperature stability in the accelerometer housing 35 can reduce the dimensional variations within the accelerometer assembly to a point where errors due to thermal effects become sufficiently small for efficient open-loop operation of the system.

While we have described above the principles of our invention in connection with specific apparatus, it is to be clearly understood that this description is made only by way of example and not as a limitation to the scope of our invention as set forth in the objects thereof and in the accompanying claims.

We claim:

1. An accelerometer for use with a moving vehicle comprising a housing having first and second chambers, an inertia member, resilient means for supporting said inertia member within said second chamber for relative movement with respect to said housing along a predetermined axis when the rate of movement of said vehicle changes, said inertia member comprising a first flat slab of material having the same high Q stable characteristics of each of said resilient members and each of said resilient members comprises a comparatively thin flat slab of said high Q stable material having a width which is much greater than its thickness, means associated with said inertia member and said housing for producing an interferometer radiation pattern which moves in a given relation to said relative movement comprising a source of light disposed in said first chamber, means connecting said first and second chambers for passage of a light beam from said light source to said second chamber, interferometer means disposed in said second chamber and coupling said light beam to said inertia member for producing an interference pattern; means for maintaining the temperature of said second chamber substantially constant, means for sensing movement of said radiation pattern and means controlled by said sensing means to produce a digital output indicative of the magnitude and direction of relative movement detected by said sensing means.

2. An accelerometer for use with a moving vehicle comprising a housing having first and second chambers, a source of light in said first chamber, an inertia member in said second chamber, resilient means for supporting said inertia member for movement relative said housing when the rate of movement of said vehicle changes, said means for supporting said inertia member comprising a plurality of resilient members disposing said inertia member for said relative movement substantially parallel to a predetermined axis of said housing, means providing a passage between said chambers for directing a beam of light from said light source into said second chamber, interferometer means associated with said inertia member and coupling said light beam to said inertia member to produce a light pattern movable in response to any relative movement of said inertia member with respect to said housing when the rate of movement of said vehicle changes, and means for sensing said movement of said light pattern to produce an output of the magnitude and direction of said relative movement.

3. An accelerometer according to claim 2 wherein said inertia member comprises a first flat slab of material having the same high Q stable characteristics of each of said resilient members and wherein each of said resilient members comprises a comparatively thin flat slab of said high Q stable material having a width which is much greater than its thickness, a second flat slab disposed as a base and means including said thin slabs for securing said first flat slab in parallel relation to said second flat slab.

4. An accelerometer according to claim 2 wherein said inertia member comprises a first flat slab of material having high Q stable characteristics, each said resilient member comprises a comparatively thin flat slab of high Q stable material having a width which is much greater than its thickness, a second flat slab of said material, means securing said second flat slab to a wall of said second chamber, said thin slabs supporting said first flat slab from said second flat slab parallel to said predetermined axis, said thin slabs being disposed substantially perpendicular to said first flat slab and parallel to each other, said thin slabs having a substantially smaller spring constant in a direction parallel to said predetermined axis and negligible flexibility along axes perpendicular to said predetermined axis to restrict said inertia member for movement substantially parallel to said predetermined axis when subject to the action of said change of rate of movement of said vehicle.

5. An accelerometer for use with a moving vehicle comprising a housing having first and second chambers, a source of light in said first chamber, an inertia member in the form of a rectangular parallelepiped in said second chamber, resilient means for supporting said inertia member for movement relative said housing along a predetermined axis when the rate of movement of said vehicle changes, means providing a passage between said chambers for directing a beam of light from said light source into said second chamber, interferometer means associated with said inertia member and coupling said light beam to said inertia member to produce a light pattern movable in response to any relative movement of said inertia member with respect to said housing when the rate of movement of said vehicle changes comprising a partially reflecting mirror disposed in the path of said light beam, a plurality of reflecting members, means disposing said reflecting members in coactive relation with said partially reflecting mirror to establish as the standard light path length for said interferometer the length of the light path from said partially reflecting mirror to said reflecting members and back to said partially reflecting mirror, first reflecting means disposed on one end of said inertia member angularly disposed to the surfaces of said inertia member, second reflecting means disposed opposite said first reflecting means for reflecting the light beam passing through said partially reflecting mirror, the length of the path from said partially reflecting mirror to said second and first reflecting means and back to said partially reflecting mirror being substantially equal to said standard length when said inertia member is at rest and not moving relative said housing, and means for sensing said movement of said light pattern to produce an output indicative of the magnitude and direction of said relative movement.

6. An accelerometer according to claim 5 wherein said first reflecting means comprises a first mirror, a second mirror, means disposing said first mirror adjacent said second mirror, said second reflecting means comprises a third mirror disposed parallel to said first mirror for reflecting said light beam between said first mirror and said third mirror in a zig-zag path, and said second mirror is adapted to reflect said reflected light beam from said first mirror at the end of said zig-zag path back substantially along said same zig-zag path to said partially reflecting mirror when said inertia member is at rest and the length of said zig-zag path varies in accordance with said relative movement.

7. An accelerometer for use in a moving vehicle comprising a housing having first and second chambers, a radiating beam source disposed in said first chamber, a passage between said chambers for directing said radiating beam into said second chamber, an inertia member, resilient means supporting said inertia member within said second chamber for movement relative said housing along a predetermined axis when the rate of movement of said vehicle changes, said inertia member comprising a first flat slab of material having the same high Q stable characteristics of each of said resilient members and each of said resilient members comprises a comparatively thin flat slab of said high Q stable material having a width which is much greater than its thickness, interferometer means associated with said inertia member and coupling said radiating beam to said inertia member to produce a moving radiation pattern in response to relative movement between said inertia members and said housing, means for sensing movement of said radiation pattern to indicate the magnitude and direction of said relative movement, means for maintaining the temperature of said second chamber constant comprising a layer of heat insulating material surrounding said second chamber, a transparent member disposed in said passage to prevent heat transfer through said passage between said first and second chambers, means spacing said second chamber from said insulating material, means for minimizing temperature gradients disposed intermediate said second chamber and said insulating material, means disposing within said space a control material having thermal ballasting properties and a resistance winding for heating said control material upon application of an electric current to said winding, and control means for sensing changes in the volume of said control material proportional to the heat content of said control material, said control means having an output signal for controlling the application of said electric current to said resistance winding.

8. An accelerometer for use with a moving vehicle comprising a housing having first and second chambers, means responsive to the change in rate of movement of said vehicle along a predetermined axis of said accelerometer comprising an inertia member composed of a first slab of material having stable characteristics, a plurality of resilient members composed of thin slabs of high Q, stable material and having a non-uniform width much greater than its thickness, a second slab of said material, means securing said second slab to a wall of said second chamber, said resilient members supporting said first slab from said second slab parallel to said predetermined axis, said resilient members being substantially parallel to each other and substantially perpendicular to said first slab with a short parallel side of each said resilient member being coupled to said first slab effectively equidistant from the center of gravity of said first slab and the other parallel side of each said resilient member being coupled to said second slab, said resilient members having a substantially smaller spring constant in a direction parallel to said predetermined axis and negligible flexibility along axes perpendicular to said predetermined axis to restrict said inertia member for movement relative said housing substantially parallel to said predetermined axis when the rate of movement of said vehicle changes, a source of light disposed in said first chamber, interferometer means disposed in said second chamber and coacting with said inertia member and coupling the light beam from said light source to said inertia member to produce an interferometer fringe pattern which moves in accordance with the relative movement of said inertia member, means for maintaining substantially constant the temperature of said second chamber and photoelectric means for sensing said movement of said fringe pattern to produce a digital output of said accelerometer indicative of the magnitude and direction of said movement of said fringe pattern which is mathematically related to said change in the rate of movement of said vehicle.

9. An accelerometer according to claim 8 wherein said inertia member has an angular groove at one end thereof, first reflecting means disposed on a first side of said groove, second reflecting means disposed on the other side and said interferometer means includes a mirror disposed adjacent said end parallel to said first reflecting means for reflecting a beam of light from said light source between said mirror and said first reflecting means in a zig-zag path to increase the path length of said beam and return said beam on substantially said path after being reflected from said second reflecting means when the rate of movement of said vehicle is constant, and the length of said zig-zag path varies in accordance with any change in the rate of movement of said vehicle.

10. An accelerometer for use with a moving vehicle comprising a housing, an inertia member, resilient means for supporting said inertia member within said housing for relative movement with respect to said housing along a predetermined axis when the rate of movement of said vehicle changes, a first reflecting surface carried by said inertia member at the end thereof and inclined at an angle to the direction of said relative motion, a second reflecting surface carried by said housing in opposed parallel relation to said first reflecting surface, a source of light, a photosensing detector, means supporting said light source and said detector to said housing and means including said first and second surfaces for projecting light from said source to said detector, said means for projecting light being disposed to cause said light to be subjected to multiple reflection between said reflecting surfaces to thereby amplify movement of said inertia member.

References Cited in the file of this patent

UNITED STATES PATENTS

| | | |
|---|---|---|
| 1,625,625 | Ricker | Apr. 19, 1927 |
| 2,210,970 | Bonell | Aug. 13, 1940 |
| 2,232,177 | Ide | Feb. 18, 1941 |
| 2,258,613 | Kannenstine et al. | Oct. 14, 1941 |
| 2,462,292 | Snyder | Feb. 22, 1949 |
| 2,479,802 | Young | Aug. 23, 1949 |
| 2,583,596 | Root | Jan. 29, 1952 |
| 2,604,004 | Root | July 22, 1952 |
| 2,815,452 | Mertz | Dec. 3, 1957 |
| 2,840,366 | Wing | June 24, 1958 |
| 2,948,152 | Meyer | Aug. 9, 1960 |

OTHER REFERENCES

An article "Accurate Accelerometers Developed by the Bureau of Public Roads," by L. W. Teller, from the magazine Public Roads, December 1924, pp. 1–9 (page 1).

An article "A Bidirectional Electronic Counter for Use in Optical Interferometry," by F. H. Branin, Jr., from the Journal of the Optical Society of America, October 1953, pages 839–848.